Patented Nov. 22, 1932

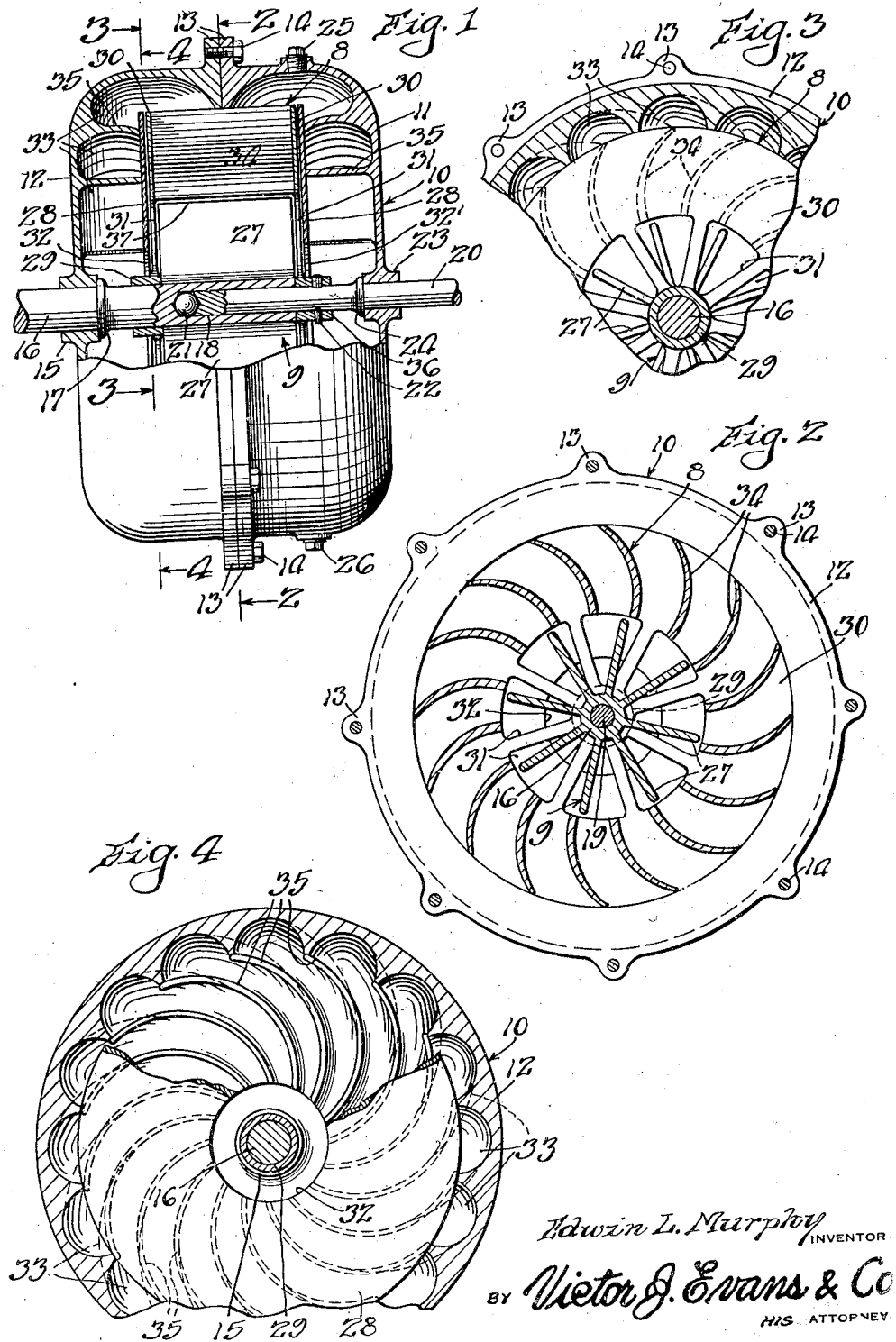

1,888,881

UNITED STATES PATENT OFFICE

EDWIN L. MURPHY, OF CHICAGO, ILLINOIS

HYDRAULIC TRANSMISSION

Application filed April 3, 1931. Serial No. 527,546.

This invention relates to certain novel improvements in hydraulic transmissions, and has for its principal object the provision of an improved construction of this character which will be highly efficient in use and economical in manufacture.

It is an object of this invention to provide an improved hydraulic transmission for transferring power from a drive to a driven shaft, and to eliminate the use and disadvantages of gears.

It is another object of the invention to provide an inner rotor or impeller rotatable with a drive shaft and interiorly of an outer rotor connected to a driven shaft, and both being mounted in a fluid medium, and so arranged that as the impeller or inner rotor is rotated by the drive shaft pressure will be exerted thereby on the fluid medium which will rotate the outer rotor and the driven shaft.

It is another object of the invention to provide means for continuously circulating the fluid medium and transferring thereby the force of the inner rotor or impeller to the outer rotor.

It is an additional object of the invention to arrange the inner rotor or impeller and the outer rotor so that after the impeller blades have forced the operating fluid against the rotor blades and the rotor revolved by the force thus imparted thereto, the spent fluid will be free to return to the impeller without interfering with or dragging against the rotation of the rotor.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a side elevational view of the housing embodied in the invention with part thereof broken away to show the operating parts enclosed therein;

Fig. 2 is a sectional view on line 2—2 in Fig. 1;

Fig. 3 is a fragmentary sectional view on line 3—3 in Fig. 1; and

Fig. 4 is a sectional view on line 4—4 in Fig. 1.

In the drawing wherein a practical embodiment of the invention is illustrated, a housing embodied in the invention is indicated generally at 10 and includes cooperating halves 11 and 12 which have similar external ears 13 detachably joined together by bolts 14. In the wall of section 12 is a bearing surface 15 in which is rotatably mounted a drive shaft 16 which has a shoulder 17 thereon abutting the inner end of bearing 15 so as to prevent end play in the shaft 16. The shaft 16 has a bore 18 therein into which is extended the driven shaft 20 and a thrust bearing 21 is provided between the inner end of the bore 18 and the inner end of shaft 20. Shaft 20 is rotatably mounted in a bearing surface 23 provided on the housing section 11 and a shoulder 24 on the shaft 20 prevents end play thereof.

The housing 10 is intended to be filled with liquid grease or other suitable material and for this purpose a plug 25 is provided at the top of the section 11 while a drain plug 26 is provided on the lower side of section 11.

Formed integrally with the shaft 16 is an inner rotor or impeller indicated generally at 9 and which includes a plurality of radially arranged blades 27 which are integral with and rotatable with shaft 16 between similar discs 28 that are spaced apart in the housing 10, one in each of the sections 11 and 12, these discs 28 being welded or otherwise secured to ribs 35 that are integral with the side walls of the sections 11 and 12. A collar 29 floats on the shaft 16 and this collar extends through an opening 32 in one of the discs 28 (Fig. 1), a similar opening 32' being provided in the other disc 28. The blades 27 are concentric with the blades 34 of an outer and larger rotor indicated generally at 8 and which includes the curved or arcuate blades 34 that extend between side plates 30 that are integral therewith. One of the side plates 30 of the outer rotor 8 floats on the collar 29 and the other side plate 30 includes a hub 36 which is keyed to shaft 20, as at 22, for rotation therewith, both side plates 30 being provided with substantially triangular-shaped slots 31 which communicate through openings 32 and 32′ with passages 33 which are defined by the walls of the housing sections 11 and 12, ribs 35 and the discs 28. By reference to Figs. 1 and 2 it will be seen that the blades 34 of the outer rotor 8 extend outwardly from the outer ends 37 of the blades 27 of the inner rotor 9.

In the use of the invention, the housing 10 will be filled with a heavy or viscous liquid, such as grease, and shaft 16 will be connected to a suitable source of power such, for example, as the engine of an automotive vehicle. Shaft 16 will, therefore, be rotated (clockwise as seen in Fig. 2) which will rotate the inner rotor 9 and its blades 27 and this rotation of blades 27 will force the grease by centrifugal action between the blades 34 of the outer rotor 8, and the pressure thus exerted on the blades 34 of the outer rotor by the rotation of blades 27 of the inner rotor will cause the rotation of outer rotor 8, and since outer rotor 8 is keyed at 22 to drive shaft 20, shaft 20 will be rotated.

As the inner rotor 9 is rotated and grease forced between the blades 34 of the outer rotor, to cause the rotation of the outer rotor, the grease will pass from between blades 34 into the passages 33 and the grease will flow down through passages 33, through openings 32 and 32′ in stationary discs 28, and thence through slots or openings 31 in the side walls 30 of the outer rotor 8 into the spaces between the blades 27 of the inner and smaller rotor 9, a continuous circulation of the grease being thus effected and resulting in a quiet, efficient operation of the driven shaft 20.

It is to be noted that the blades 34 are spaced from each other at both ends and do not intersect, and that the same is true of the ribs 35, and that as the spent fluid passes from between the rotor blades 34 and passes into the passages 33 for return to the impeller, it is unimpeded and does not, therefore, exert a drag upon the rotor 8 since the spent fluid returning through passages 33 does not have contact with the rotor 8.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In combination with a drive and driven shaft, a transmission structure comprising a housing adapted to contain a fluid and including arcuate ribs on the inside of its side walls, stationary discs disposed over the inner ends of said ribs and cooperating with said ribs and with said walls to provide passages between said discs, a rotor fast on the driven shaft and including side plates arranged in parallelism with and between said discs, said rotor including a plurality of blades arranged between said plates, said passages having communication with the interblade spaces of said rotor, an impeller fast on the drive shaft and including a plurality of radially arranged blades rotatable between said plates, said plates and discs having openings therein providing communication between said passages and the interblade spaces of said impeller whereby rotation of the drive shaft and the impeller will force said fluid against the blades of said rotor to rotate said rotor and driven shaft, said fluid then discharging from between the blades of said rotor into said passages and returning to the interblade spaces of said impeller through said openings.

2. In combination with a drive and a driven shaft, a transmission structure comprising a fluid containing housing including side walls and ribs on the inner side of each of said walls, a stationary disc over each set of ribs and forming with said ribs and walls passages, a rotor fast on the driven shaft and including side plates arranged in parallelism with and rotatable between said discs, said rotor including a plurality of radially arranged blades arranged between said side plates, an impeller fast on the drive shaft and including radially arranged blades rotatable between said plates, said passages having communication with the interblade spaces of said rotor, said plates and discs having openings therein providing communication between the interblade spaces of said impeller and said passages whereby rotation of said drive shaft and impeller and the centrifugal force imparted thereby to said fluid will rotate said rotor and driven shaft and said fluid be thus continuously circulated through said passages, said openings, and the interblade spaces of the impeller and rotor.

3. A fluid transmission comprising a drive and a driven shaft, a housing adapted to contain a fluid power transmitting medium, a rotor in said housing fast on the driven shaft and including approximately radial blades and side plates rotatable with said blades and between which said blades are arranged, an impeller fast on the drive shaft and including radial blades shorter than said rotor blades and rotatable between said side plates, a stationary disc on the outer side of each of said plates and in parallelism therewith, said discs and plates having openings formed therein about the centers thereof, and ribs in said housing providing with said discs and the walls of said housing passages communicating with said openings and with the interblade spaces of said rotor whereby said fluid may be continuously circulated by said impeller blades against and between said rotor blades to be discharged directly from the latter into said passages and be returned through said passages and openings to the interblade spaces of said impeller.

4. A fluid transmission comprising a drive and a driven shaft, a housing adapted to contain a fluid power transmitting medium, a rotor in said housing fast on the driven shaft and including approximately radial blades and side plates rotatable with said blades and between which said blades are arranged, an impeller fast on the drive shaft and including radial blades shorter than said rotor blades and rotatable between said side plates, a stationary disc on the outer side of each of said plates and in parallelism therewith, said discs and plates having openings formed therein about the centers thereof, and ribs in said housing providing with said discs and the walls of said housing passages communicating with said openings and with the interblade spaces of said rotor whereby said fluid may be continuously circulated by said impeller blades against and between said rotor blades to rotate said motor and be discharged therefrom into said passages and from said passages be returned through said openings into the interblade spaces of said impeller, said ribs being spaced from each other at both ends and extending laterally toward said discs.

In testimony whereof I affix my signature.

EDWIN L. MURPHY.